(12) United States Patent
Sato

(10) Patent No.: US 8,891,120 B2
(45) Date of Patent: Nov. 18, 2014

(54) IMAGE PROCESSING DEVICE, IMAGE FORMING DEVICE AND IMAGE PROCESSING DEVICE MANAGEMENT SYSTEM

(75) Inventor: Masato Sato, Tokyo (JP)

(73) Assignee: Oki Data Corporation, Tokyo (JP)

( * ) Notice: Subject to any disclaimer, the term of this patent is extended or adjusted under 35 U.S.C. 154(b) by 236 days.

(21) Appl. No.: 13/551,700

(22) Filed: Jul. 18, 2012

(65) Prior Publication Data

US 2013/0021621 A1    Jan. 24, 2013

(30) Foreign Application Priority Data

Jul. 20, 2011    (JP) .................................. 2011-159403

(51) Int. Cl.
*G06F 3/12*    (2006.01)
*G06K 15/00*    (2006.01)

(52) U.S. Cl.
CPC ............ *G06F 3/1204* (2013.01); *G06F 3/1288* (2013.01); *G06K 15/402* (2013.01); *G06F 3/1229* (2013.01)
USPC .......................... 358/1.15; 358/1.14; 358/1.18

(58) Field of Classification Search
CPC ... G06F 3/1235; G06F 3/1273; G06F 3/1237; G06K 15/402; G06K 15/4075
See application file for complete search history.

(56) References Cited

U.S. PATENT DOCUMENTS

2008/0151298 A1*    6/2008    Kurotsu ....................... 358/1.15

FOREIGN PATENT DOCUMENTS

JP    A-2004-192347    7/2004

* cited by examiner

*Primary Examiner* — Dov Popovici
(74) *Attorney, Agent, or Firm* — Muncy, Geissler, Olds & Lowe, P.C.

(57) ABSTRACT

An image processing device is connected to a management server that analyzes a data file in which information is described in a predetermined format and provides an administrator with the information. The image processing device includes a data file format management table that arranges and stores data, which is information of the image processing device, an input part that accepts from the user an instruction for changing the data in the predetermined format, a data file format management table update part that rearranges the data stored in the data file format management table based on the instruction, a data file generation part that generates a file by describing the data stored in the data file format management table after the rearrangement, and a communication part that transmits the file as the data file to the management server.

13 Claims, 17 Drawing Sheets

Data File Format Management Table 624

| Item No. | Item Name | Desc. Order No. | Counter Name | Origination ID | Default Item |
|---|---|---|---|---|---|
| 001 | Printer Model | 1 | PrinterModel | Image Forming Device Info. Table (ID001) | O |
| 002 | Serial No. | 2 | serialNo | Image Forming Device Info. Table (ID002) | O |
| 003 | Remain. Toner Amount | 3 | TonerLevel | Image Forming Device Info. Table (ID010) | O |
| 004 | Printed Page No. | 4 | PrinterCounter | Image Forming Device Info. Table (ID015) | |
| .. | .. | .. | .. | .. | .. |
| 019 | Copied Page No. | 19 | CopyCount | Image Forming Device Info. Table (ID040) | O |

Fig. 7

27 Display Part

[Changing Configuration]

| Desc. Order No. | Item Name | Item No. | Counter Name | Origination ID | Default Item |
|---|---|---|---|---|---|
| 1 | Printer Model | 001 | PrinterModel | Image Forming Device Info. Table (ID001) | O |
| 2 | Serial No. | 002 | serialNo | Image Forming Device Info. Table (ID002) | O |
| 3 | Remain. Toner Amount | 003 | TonerLevel | Image Forming Device Info. Table (ID010) | O |
| 4 | Printed Page No. | 004 | PrinterCounter | Image Forming Device Info. Table (ID015) | .. |
| .. | .. | .. | .. | .. | .. |
| 19 | Copied Page No. | 019 | CopyCount | Image Forming Device Info. Table (ID040) | O |

▽ Set Counter Name

[Change]  [Delete]

[Adding Configuration Items]

| Desc. Order No. | Item Name | Item No. | Counter Name | Origination ID |
|---|---|---|---|---|
| 20 | | 020 | | |

[Add]

Fig. 10

Data File Format Management Table 624

| Item No. | Item Name | Desc. Order No. | Counter Name | Origination ID | Default Item |
|---|---|---|---|---|---|
| 001 | Printer Model | 1 | PrinterName | Image Forming Device Info. Table (ID001) | ○ |
| 002 | Serial No. | 3 | serial_no | Image Forming Device Info. Table (ID002) | ○ |
| 003 | Remain. Toner Amount | 2 | TonerLevel | Image Forming Device Info. Table (ID010) | ○ |
| 004 | Printed Page No. | 4 | TotalPrintCount | Image Forming Device Info. Table (ID015) | ○ |
| : | : | : | : | : | : |
| 019 | Copied Page No. | 19 | CopyCount | Image Forming Device Info. Table (ID040) | ○ |

Fig. 11

27 Display Part

[Changing Configuration]

| Desc. Order No. | Item Name | Item No. | Counter Name | Origination ID | Default Item |
|---|---|---|---|---|---|
| 1 | Printer Model | 001 | PrinterName | Image Forming Device Info. Table (ID001) | ○ |
| 3 | Serial No. | 002 | serial_no | Image Forming Device Info. Table (ID002) | ○ |
| 2 | Remain. Toner Amount | 003 | TonerLevel | Image Forming Device Info. Table (ID010) | ○ |
| 4 | Printed Page No. | 004 | TotalPrintCount | Image Forming Device Info. Table (ID015) | : |
| : | : | : | : | : | : |
| 19 | Copied Page No. | 019 | CopyCount | Image Forming Device Info. Table (ID040) | ○ |

Set Counter Name

Configuration Completed

Fig. 12

Data File Analysis Format Table

| Item Name | Counter Name |
|---|---|
| Printer Model | PrinterName |
| Serial No. | serial_no |
| Remaining Toner Amount | TonerLevel |
| Printed Page No. | TotalPrintCount |
| : | : |

Data File Format Management Table

| Item No. | Item Name | Desc. Order No. | Counter Name | Origination ID | Default Item |
|---|---|---|---|---|---|
| 001 | Printer Model | 1 | PrinterModel | Image Forming Device Info. Table (ID001) | O |
| 002 | Serial No. | 2 | serialNo | Image Forming Device Info. Table (ID002) | O |
| 003 | Remain. Toner Amount | 3 | TonerLevel | Image Forming Device Info. Table (ID010) | O |
| 004 | Tray 1 Printed Page No. | 4 | Tray1PrintCount | Image Forming Device Info. Table (ID015) | O |
| 005 | Tray 2 Printed Page No. | 5 | Tray2PrintCount | Image Forming Device Info. Table (ID016) | O |
| 006 | Tray 3 Printed Page No. | 6 | Tray3PrintCount | Image Forming Device Info. Table (ID017) | |
| ... | ... | ... | ... | ... | ... |

[Changing Configuration]

| Desc. Order No. | Item Name | Item No. | Counter Name | Origination ID | Default Item |
|---|---|---|---|---|---|
| 1 | Printer Model | 001 | PrinterModel | Image Forming Device Info. Table (ID001) | ○ |
| 2 | Serial No. | 002 | serialNo | Image Forming Device Info. Table (ID002) | ○ |
| 3 | Remain. Toner Amount | 003 | TonerLevel | Image Forming Device Info. Table (ID010) | ○ |
| 4 | Tray 1 Printed Page No. | 004 | Tray1PrintCount | Image Forming Device Info. Table (ID015) | ○ |
| 5 | Tray 2 Printed Page No. | 005 | Tray2PrintCount | Image Forming Device Info. Table (ID016) | ○ |
| 6 | Tray 3 Printed Page No. | 006 | Tray3PrintCount | Image Forming Device Info. Table (ID017) | ○ |
| ... | ... | ... | ... | ... | ... |
| 19 | Copied Page No. | 019 | CopyCounter | Image Forming Device Info. Table (ID040) | ○ |

☑ Set Counter Name   [Change]  [Delete]

[Adding Configuration Items]

| Desc. Order No. | Item Name | Item No. | Counter Name | Origination ID |
|---|---|---|---|---|
| 20 | Total Printed Page No. | 020 | TotalPrintCount | Image Forming Device Info. Table (ID015 + ID016 + ID017) |

[Add]

27 Display Part

Fig. 16

Data File Format Management Table After Change  
624

| Item No. | Item Name | Desc. Order No. | Counter Name | Origination ID | Default Item |
|---|---|---|---|---|---|
| 001 | Printer Model | 1 | PrinterName | Image Forming Device Info. Table (ID001) | ○ |
| 002 | Serial No. | 2 | serial_no | Image Forming Device Info. Table (ID002) | ○ |
| 003 | Remain. Toner Amount | 3 | TonerLevel | Image Forming Device Info. Table (ID010) | ○ |
| 004 | Tray 1 Printed Page No. | — | Tray1PrintCount | Image Forming Device Info. Table (ID015) | ○ |
| 005 | Tray 2 Printed Page No. | — | Tray2PrintCount | Image Forming Device Info. Table (ID016) | ○ |
| 006 | Tray 3 Printed Page No. | — | Tray3PrintCount | Image Forming Device Info. Table (ID017) | ○ |
| ... | ... | ... | ... | ... | ... |
| 020 | Total Printed Page No. | 4 | TotalPrintCount | Image Forming Device Info. Table (ID015 + ID016 + ID017) | × |

Fig. 17

IMAGE PROCESSING DEVICE, IMAGE FORMING DEVICE AND IMAGE PROCESSING DEVICE MANAGEMENT SYSTEM

CROSS REFERENCE TO RELATED APPLICATION

The present application is related to, claims priority from and incorporates by reference Japanese Patent Application No. 2011-159403, filed on Jul. 20, 2011.

TECHNICAL FIELD

This invention relates to an image processing device, an image forming device and an image processing device management system. In particular, this invention relates to an image processing device and an image forming device, which provide information of the device to a management device connected through a network and which are manageable by the management device, and such an image processing device management system.

BACKGROUND

Conventionally, there is a technology for managing a printer, a multifunction peripheral and the like (hereinafter, referred to as a network printer) provided in an office and the like using a management server through a network. The management server predicts the life of replacement parts and consumable items and/or predicts time when the remaining amount runs out, by obtaining remaining amount information and the like of the consumable item from the network printer.

A data file describing the information subject to management is sent from the network printer through the network. The management server managers the network printer based on the information obtained by analyzing the data file (see JP Laid-Open Patent Application No. 2004-192347, for example).

However, unless the data file is described in a format which the management server can analyze, the management server cannot manage the image processing device (network printer). Therefore, the management server cannot analyze the data file that the image processing device transmits.

In addition, a description format of the data file generated by the image processing device is predetermined and also varies according to the manufactures and models. Therefore, it is necessary to create specialized software for providing the management server with a function to analyze the data file and to install the software in the management server in advance.

As described above, a mutual relationship must be established beforehand between the management server and the image processing device. In addition, the management server cannot obtain the information of the image processing device unless the management server has a function to analyze the data file transmitted from the image processing device. Therefore, there is a problem that an administrator is incapable to see the information of the image processing device.

The present invention attempts to solve the above-described problems. One of objects of the present invention is to provide an image processing device, an image forming device and an image processing device management system, by which information of the device can be obtained by the management server connected through a network.

SUMMARY

In order to solve one of the above problems, one of embodiments of the present invention is an image processing device that is connected to a management server that analyzes a data file in which information is described in a predetermined format and that provides an administrator with the information. The image processing device includes a data file format management table that arranges and stores data, which is information of the image processing device, an input part that accepts from the user an instruction for changing the data in the predetermined format, a data file format management table update part that rearranges the data stored in the data file format management table based on the instruction, a data file generation part that generates a file by describing the data stored in the data file format management table after the rearrangement, and a communication part that transmits the file as the data file to the management server.

According to the above configuration, the image processing device transmits data file, which is described in a format that the management server can analyze, to the management server.

The management server receives the data file described in a predetermined format (e.g., attachment file to electronic mail (hereinafter "email")) from the image processing device (image forming device) and provides an administrator with information of the image processing device (e.g., number of image formations, remaining amount of consumable items, etc.).

The data file format management table update part rearranges the information of the device (image processing device) stored in the data file format management table into the predetermined format in accordance with a change instruction accepted by the input part. The data file generation part generates a file in which the rearranged data is described, and the communication part transmits the generated file as a data file to the management server.

When a manufacturer of the management server and a manufacturer of the image processing device are different, a data format of the data stored in the data file format management table is often different from a file format (predetermined format) of the data file that the management server receives. Even in such a case, the data format of the data file format management table can be rewritten in the predetermined format via the input part while the user of the image processing device checks the user manual or the product specification of the management server. As a result, the data file described in the predetermined format is transmitted to the management server from the image processing device, and information of the image processing device manufactured by a different manufacturer is provided to the administrator of the management server (e.g., at a remote location).

For the change instruction that the input part accepts, it is preferable that a user interface is used that displays the data format (data arrangement) of the data file format management table for adding, deleting and changing the displayed items.

In addition, data of the data file format management table is preferably stored with management items and description order number items associated with each other. The data file generation part preferably generates a file in which the data is described in the order of the description order number items.

In addition, the transmission of the data file from the image processing device to the management server is preferably performed in predetermined time intervals. The predetermined time intervals are preferably determined based on the remaining amount of consumable items and a change ratio of the image formation times of the image processing device.

According to the present invention, an image processing device, an image forming device and an image processing device management system are provided, by which information of the device can be obtained by the management server connected through a network.

BRIEF DESCRIPTION OF THE DRAWINGS

FIG. 7 illustrates an example of a data file format management table included in the multifunction peripheral server.

FIG. 10 illustrates an example of a data file format configuration screen displayed on a display part.

FIG. 11 illustrates an example of the data file format management table after an update process, included in the multifunction peripheral.

FIG. 12 illustrates an example of a data file format configuration result confirmation screen displayed on the display part.

FIG. 15 illustrates another example of the data file format management table included in the multifunction peripheral server.

FIG. 16 illustrates an example in which an additional item is input by the user in the data file format configuration screen displayed on a display part.

FIG. 17 illustrates another example of the data file format management table after an update process, included in the multifunction peripheral.

DETAILED DESCRIPTION OF EMBODIMENTS

Figure 1:
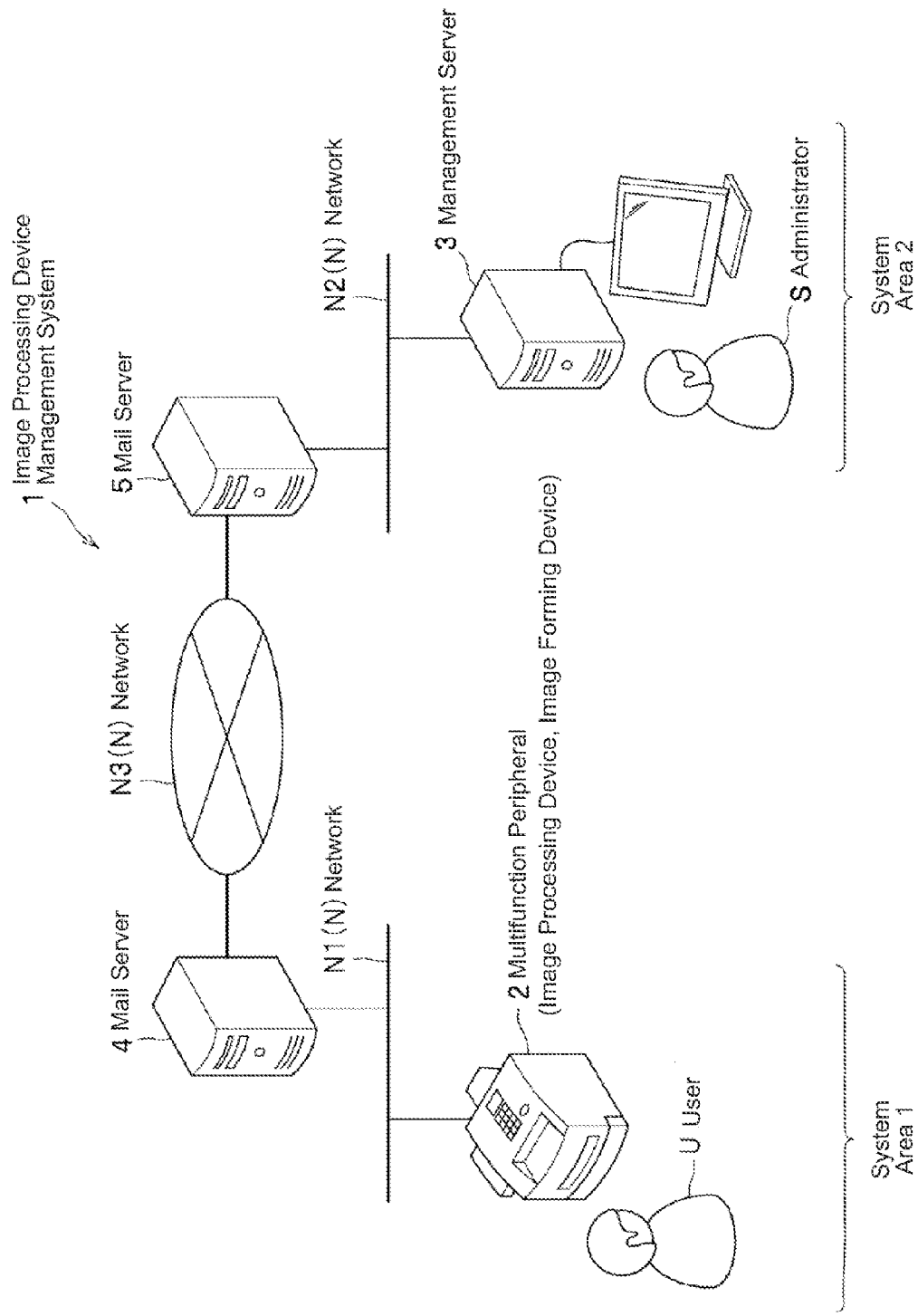
FIG. 1 is a block diagram of an image processing device management system according to a first embodiment.

Embodiments of the present invention (hereinafter referred to as "the present embodiment" or "the present embodiments") are explained in detail below with reference to the figures. Each figure only illustrates the embodiment(s) schematically. Therefore, the embodiments are not limited to those shown in the drawings. In addition, in each drawing, common and similar components are marked with the same symbols, and duplicative explanations are omitted.

First Embodiment

Configuration of Image Processing Device Management System

As shown in FIG. 1, an image processing device management system according to a first embodiment includes a system area 1 that includes a multifunction peripheral 2 as an image processing device and as an image forming device possessed by a user U and a system area 2 that includes a management server 3 that provides information of the multifunction peripheral 2 to an administrator S.

The system area 1 includes the multifunction peripheral 2 and a mail server 4. The multifunction peripheral 2 and the mail server 4 are communicatably connected through a network N1.

The system area 2 includes the management server 3 and a mail server 5. The management server 3 and the mail server 5 are communicatably connected through a network N2.

Moreover, the mail server 4 of the system area 1 and the mail server 5 of the system area 2 are communicatably connected through a network N3.

The multifunction peripheral 2 is, for example, an electrophotographic recording printer, a facsimile device, a photocopy device, and a multifunction printer (MFP). In addition, the multifunction peripheral 2 includes a function to transmit email. Details of the multifunction peripheral 2 are described later.

The management server 3 is a computer, for example. The management server 3 includes a monitor (later-discussed display part 34) that provides the information by an image to the administrator 3. In addition, the management server 3 includes a function to receive email. Details of the management server 3 are described later.

The mail server 4 and the mail server 5 are servers for exchanging email. The mail server 4 transmits email to the device (multifunction peripheral 2) connected to the system area 1 and receives email from the device (multifunction peripheral 2). The mail server 5 transmits email to the device (management server 3) connected to the system area 2 and receives email from the device (management server 3).

Each of the mail server 4 and the mail server 5 is configured from a simple mail transfer protocol (SMTP) server and a post office protocol (POP) server. It is assumed that computers and other printers are also connected to the network N1 and the network N2 to which the mail servers 4 and 5 are respectively connected.

The mail server 4 and the mail server 5 may not be necessary because the multifunction peripheral 2 and the management server 3 according to the first embodiment have functions to transmit and receive email.

The network N1, the network N2 and the network N3 are computer networks that are mutually connected using an internet protocol technology through a wide area network (WAN) and a wired/wireless local area network (LAN). Instead of LAN, ZigBee (registered trademark) or Bluetooth (registered trademark) may be used. When the image processing device management system 1 structures a large size network, the network N3 may be a broadband network, such as an asymmetric digital subscriber line (ADSL) or an optical communication line. The network N1, the network N2 and the network N3 are collectively referred to as a network N below.

<<Management Server 3>>

The management server 3 that manages the multifunction peripheral 2 according to the first embodiment is explained. Here, because the management server 3 is an existing generic printer management server, only the configurations that are required to achieve the disclosure are explained below.

Figure 2:
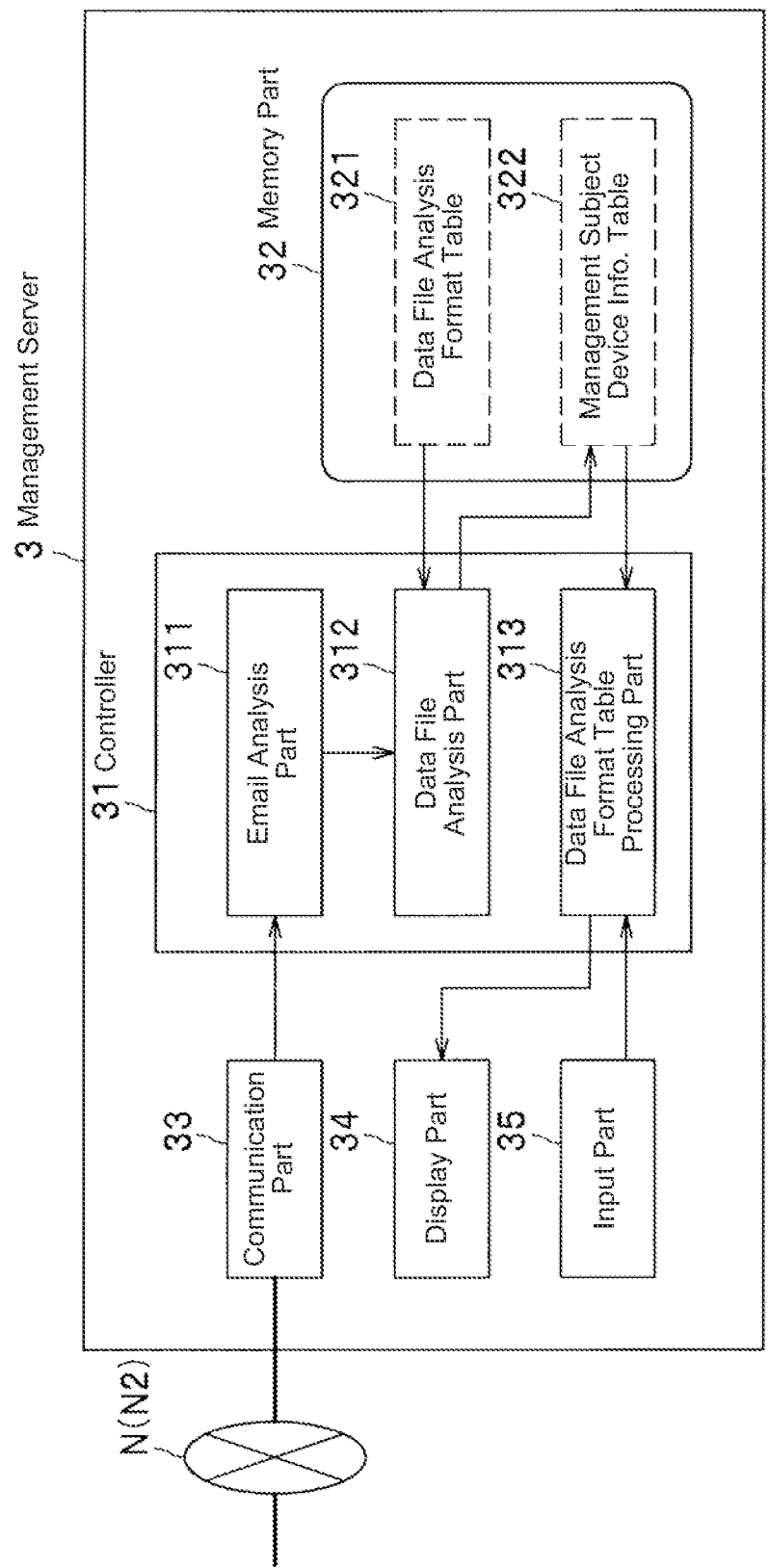
FIG. 2 is a block diagram illustrating a configuration of a management server by which a multifunction peripheral is subject to management, according to the first embodiment.

As shown in FIG. 2, the management server 3 includes a controller 31, a memory part 32, a communication part 33, a display part 34 and an input part 35. First, the communication part 33, the display part 34 and the input part 35 are explained, and then the memory part 32 and the controller 31 are explained.

(Communication Part 33, Display Part 34, Input Part 35)

The communication part 33 includes an external connection part for connecting to the network N (N2) and is a component that transmits and receives data from and to an external device (e.g., mail server 5) through the network N.

The display part 34 is a component that displays screen data as an image on a screen so that the administrator S can view. The display part 34 is a liquid crystal display (LCD) or a display, for example.

The input part 35 is a component that receives requests from the administrator S and is a keyboard and a mouse, for example.

The display part 34 and the input part 35 may be a touch panel that includes both a display function, such as the LCD, and a position input function, such as a touch pad.

(Memory Part 32)

The memory part 22 stores various data and includes a data file analysis format table 321 and a management subject device information table 322. The memory part 28 is a non-volatile memory device, such as a hard disk (HD) and an optical disk.

(Data File Analysis Format Table 321)

Figure 3:
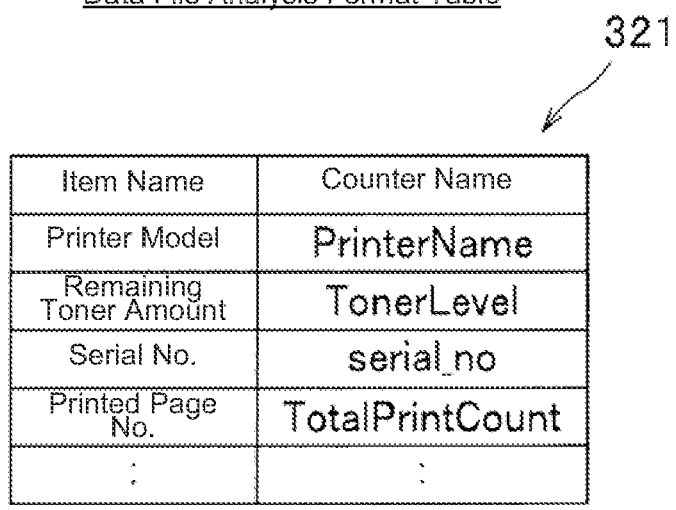
FIG. 3 illustrates an example of a data file analysis format table included in the management server.

FIG. 3 shows an example of the data file analysis format table. The data file analysis format 321 table is configured from an item name and a counter name.

Under the item name, "Printer Model," "Remaining Toner Amount," "Serial No.," "Printed Page Numbers" and the like are registered. The counter name is configured and stored for each item. In FIG. 3, the counter names "PrinterName," "TonerLevel," "serial_no," and "TotalPrintCount" are stored in correspondence with the item name "Printer Model," "Remaining Toner Amount," "Serial No.," and "Printed Page Numbers," respectively.

(Management Subject Device Information Table 322)

Figure 4:
FIG. 4 illustrates an example of a management subject device information table included in the management server.

The management subject device information table 322 stores information of the multifunction peripheral 2 that the management server 3 manages. FIG. 4 shows an example of the management subject device information table. The management subject device information table 322 is configured from printer models, serial numbers, remaining toner amounts (%), printed page numbers and the like.

The management subject device information table 322 shown in FIG. 4 stores the following data.

In the first line, "Printer0001," "Printer0001-0234," "20" and "356" are stored in correspondence to the printer models, the serial numbers, the remaining toner amounts (%), and the printed page numbers. In the second line, "Printer0001," "Printer0001-0255," "90" and "678" are stored in correspondence to the printer models, the serial numbers, the remaining toner amounts (%), and the printed page numbers. In the third line, "Printer0003," "Printer0003-1899," "70" and "211" are stored in correspondence to the printer models, the serial numbers, the remaining toner amounts (%), and the printed page numbers. In the fourth line, "Printer0002," "Printer0002-3442," "70" and "167" are stored in correspondence to the printer models, the serial numbers, the remaining toner amounts (%), and the printed page numbers.

(Controller 31)

The controller 31 includes an email analysis part 311, a data file analysis part 312, and a data file analysis format table processing part 313. For example, the controller 31 is configured from a central processing unit (CPU). Functions of each of the processing parts that configure the controller 31 are achieved as the CPU extracts and executes a program (not shown) stored in the memory part 32.

The processes performed by the controller 31 are functions that general printer management servers have, and software for performing the process to display the data of management subject devices (e.g., printer) stored in the memory part 32 in a screen of the display part 34 are pre-installed. As the controller 31 executes the software, the management server 3 achieves the functions as a printer management server.

(Email Analysis Part 311)

The email analysis part 311 is a component that performs predetermined processes based on email to the management server 3 received by the communication part 33.

In the first embodiment, the email analysis part 311 has the mail format beforehand and analyzes the email in accordance with the mail format. This mail format is information that the user U can easily know and that is described in the product specification or the user manual of the management server 3. The management server 3 performs the predetermined processes as the user U transmits the email in accordance with the mail format. Here, the user U may be the administrator S.

For example, a process step is predefined for extracting the data file attached to the email and outputting the data file to the data file analysis part 312 when there is a mail format in which a subject of email is "'xxxxx-yyyyy' PrinterData" and when email with this format is received.

When email with the subject "'Printer1234-567890-Printer1234' PrinterData" is received, the email analysis part 311 determines that email with the mail format in which the subject is "'xxxxx-yyyyy' PrinterData" has been received. Then, the email analysis part 311 extracts the data file attached to the received email and outputs the data file to the data file analysis part 312. At this time, the email analysis part 311 may obtain information from the subject that serial number is "Printer1234-567890" and that the printer model is "Printer1234."

(Data File Analysis Part 312)

The data file analysis part 312 is a component that obtains the data file from the email analysis part 311, that analyzes the data file, and that stores the data described in the data file in the management subject device information table 322.

The information about the data to be described in the data file is information that the user U can easily know, similar to the mail format, and is described in the production specification and/or the user manual of the management server 3, for example. As the user U generates a data file by describing the data in accordance with the information described in the product specification and transmits the data file to the management server 3 by attaching to email, the data file analysis part 312 of the management server 3 perform the processes.

This data file only needs to be a file that the data file analysis part 312 of the management server 3 can analyze. In the first embodiment, the data file is explained as a text file described in a comma separated values (CSV) format. However, the data file may be in a tab separated values (TSV) format or in extensible markup language (XML) or fixed length data. Alternatively, the data file may be a program executable by the data file analysis part 312. In case of the program, the data file may be created as the data file analysis part 312 executes the program, and the data file analysis part 312 analyzes the data file.

After the data file is analyzed, the data file analysis part 312 refers to the data file analysis format table 321 and determines as to whether the data file contains data described in the data file is in a correct format. When the format is incorrect, the data file analysis part 312 ends the data file analysis process and discards the data file. Such a determination is made by a limitation of the number of characters, value ranges, character codes that can be used, and the like, for example.

(Data File Analysis Format Table Processing Part 313)

The data file analysis format table processing part 313 is a component that converts a configuration of the management subject device information table 322 to screen data in response to a screen display instruction input from the input part 35 and displays the screen data on a screen of the display part 34.

For example, the following processes are performed by the data file analysis format table processing part 313.

A view request for "Management Subject Device Information View Screen" (not shown) associated with the multifunction peripheral 2 is input by the administrator S via the input part 35. With this input, the data file analysis format table processing part 313 obtains data in the management subject device information table 322 associated with the multifunction peripheral 2 and converts the management subject device information table 322 to the screen data. This generation of the screen data is processed so as to be displayed on the display part 34 as a management subject device information view screen. Then, the data file analysis format table processing part 313 displayed the generated screen data (management subject device information view screen) on the display part 34. As a result, the administrator S can view the management subject device information view screen associated with the multifunction peripheral 2 that is displayed on the display part 34.

With the above-configured management server 3, a person (administrator S) of the multifunction peripheral manufacturer can easily confirm the remaining amount of a consumable item in the multifunction peripheral 2 at a remote location, by viewing the management subject device information view screen displayed on the display part 34 of the management server 3. When the remaining amount of the consumable item is low, a replacement consumable item may be delivered to the user U that uses the multifunction peripheral 2. As a result, a high quality service that does not require actions by the user U is provided.

<<Multifunction Peripheral 2>>

Figure 5:
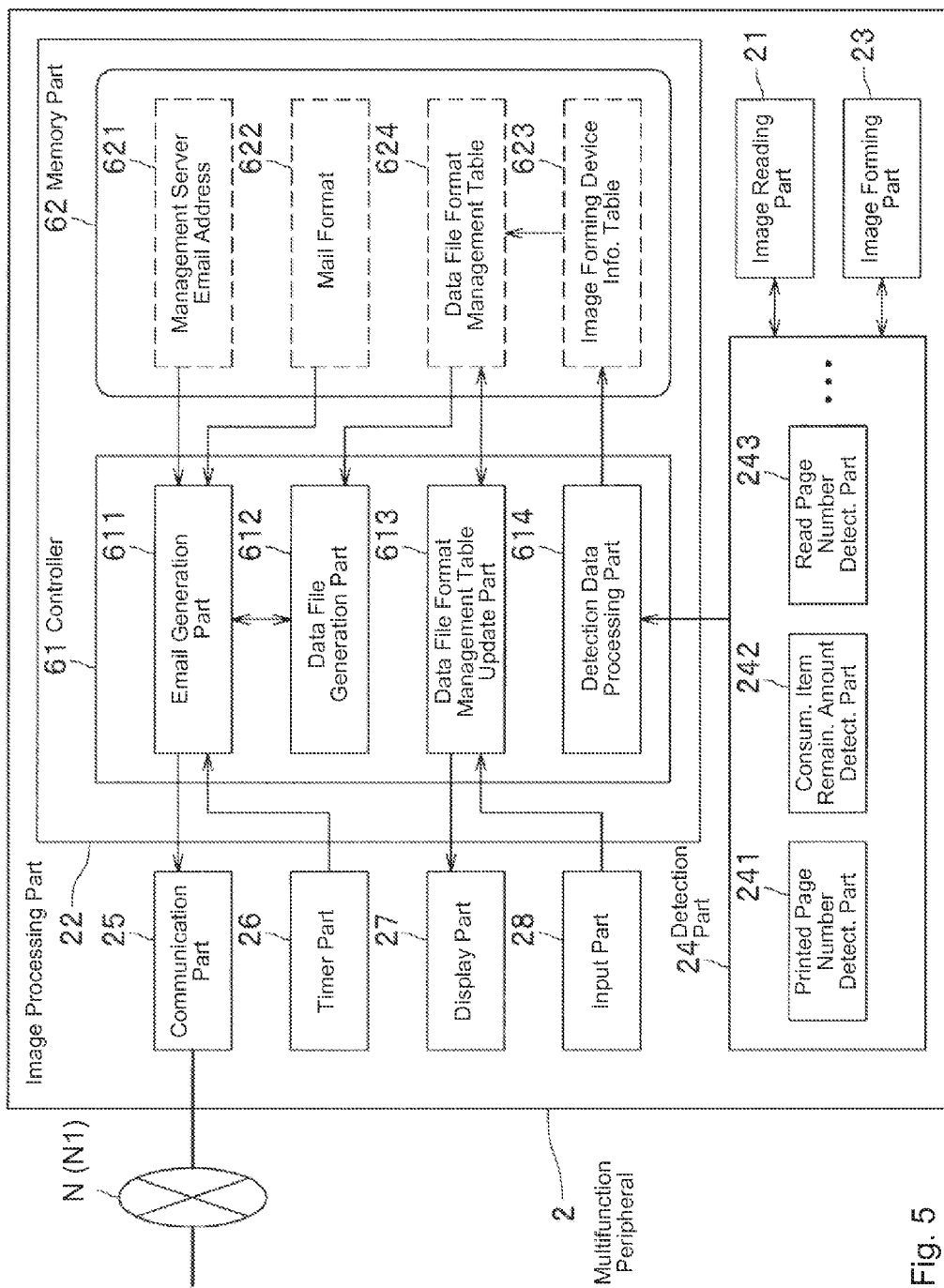
FIG. 5 is a block diagram illustrating a configuration of the multifunction peripheral according to the first embodiment.

As shown in FIG. 5, the multifunction peripheral 2 (image processing device, image forming device, information processing device) includes an image reading part 21 that reads a document and that generates image data, an image processing part 22 that performs an image process, such as color correction and the like, on the image data, an image forming part 23 that forms an image after the image process on a medium, a detection part 24, a communication part 25, a timer part 26, a display part 27 and an input part 28.

(Image Reading Part 21)

The image reading part 21 is a component that scans a document placed on a reading stage and generates image data. The image reading part 21 is a scanner, for example. The image reading part 21 includes the reading stage on which the document is placed, a document detection part that detects the placement of the document, and a document reading part that includes a sensor, that reads the document, and that generates the image data. (Image Processing Part 22)

Details of the image processing part 22 are described later.
(Image Forming Part 23)

The image forming part 23 includes a controller that controls the entire image forming part 23, a development device, a transfer roller, a fuser and the like.

The development device includes a photosensitive drum on which an electrostatic latent image is formed by a light emitting diode (LED) head, a development roller that develops the electrostatic latent image formed on the photosensitive drum as a toner image and that is rotatably positioned to face the photosensitive drum, a supply roller that moves and carries toner accommodated in a toner cartridge to the development roller, a charging roller that charges the photosensitive drum, and the like.

The transfer roller is a roller for transferring the toner image formed on the photosensitive drum onto a recording medium. The toner image transferred onto the recording medium is fixed to the recording medium by the fuser.

The development roller forms the toner image by attaching the toner on the electrostatic latent image formed on the photosensitive drum to make the electrostatic latent image visible. A bias voltage is applied to the supply roller and the development roller by a high voltage power source. The toner image is developed by transferring the toner from the development roller to the photosensitive drum by action of the electric field.

The fuser includes a heat application roller and a fusion roller that are positioned to face each other and fixes the toner image transferred onto the recording medium to the recording medium by applying heat and pressure. The heat roller includes a halogen lamp therein, for example, and precisely controls the temperature.

(Detection Part 24)

The detection part 24 is a component for detecting a number of sheets on which images are formed (printed), a remaining amount of toner, a number of remaining sheets stored in a tray, a number of scanned documents, and the like. The detection part 24 is configured from a, infrared sensor or a pressure sensor, for example. The detection part 24 includes a printed page number detection part 241, a consumable item remaining amount detection part 242, a read page number detection part 243, for example. The detection part 24 outputs detected data to the controller 61 (detection data processing part 614) of the image processing part 22.

The printed page number detection part 241 is a component that counts a number of sheets that the image forming part 23 has printed (i.e., number of printing).

The consumable item remaining amount detection part 242 includes a remaining toner amount detection part that detects a remaining amount of toner and a fed sheet number detection part that counts the number of sheets fed from a tray that accommodates the sheet.

The read page number detection part 243 is a detection part that detects a number of image data generated as the image reading part 21 reads the document.

(Communication Part 25)

The communication part 25 is a component that includes an external connection part that connects to the network N (N1) and that transmits and receives data to and from an external device (e.g., mail server 4). (Timer Part 26)

The timer part 26 is a timer from which the current time is obtained.

(Display Part 27, Input Part 28)

The display part 27 is a component that displays the image data on a display as an image for the user U to view and is a liquid crystal display (LCD), a display or the like, for example.

The input part 28 is a component that accepts a request from the user U and is a keyboard, a mouse and the like, for example.

The display part 27 and the input part 28 may be a touch panel that includes both the display function, such as an LCD, and the position input function, such as a touch pad, for example.

(Image Processing Part 22)

The image processing part 22 includes a controller 61 and a memory part 62. (Memory Part 62)

The memory part 62 stores various data and includes a management server mail address 621, a mail format 622, an image forming device information table 623, and a data file format management table 624. The memory part 28 is a non-volatile storage device, such as a HD or an optical disk.

(Management Server Mail Address 621)

The management server mail address 621 is a mail address of the management server 3 and is prestored in the memory part 62.

(Mail Format 622)

The mail format 622 is a format used when the email generation part 611 creates email. This is the data that causes a predetermination operation in which the email analysis part 311 of the management server 3 that receives the email created based on the format 622 outputs the data file attached to the email to the data file analysis part 312. The mail format 622 is stored in the memory part 62. The user U may start email software (not shown) and correct the data of the mail format 622, such as changing a sender, via the input part 28.

The mail format 622 is explained. "'Serial No.-Printer Model' PrinterData" is described in the subject of the email. The data obtained from the data file format management table 624 enters in the "Serial No." and the "Printer Model." For example, based on the image forming device information table 623 shown in FIG. 6 and the data file format management table 624 shown in FIG. 7, (ID002) "Printer1234-567890" and (ID001) "Printer1234" are described in Serial No. and Printer Model, respectively. In addition, the "Printer Model" and the "Serial No." are also described in the body of the email.

The email analysis part 311 of the management server 3 that has received the mail performs a process to output the data file attached to the email to the data file analysis part 312 by determining from the subject of the email.

(Image Forming Device Information Table 623)

The image forming device information table 623 is a memory part that stores information of the multifunction peripheral 2. The image forming device information table 623 stores preset information and detection values detected by the detection part 24.

Figure 6:
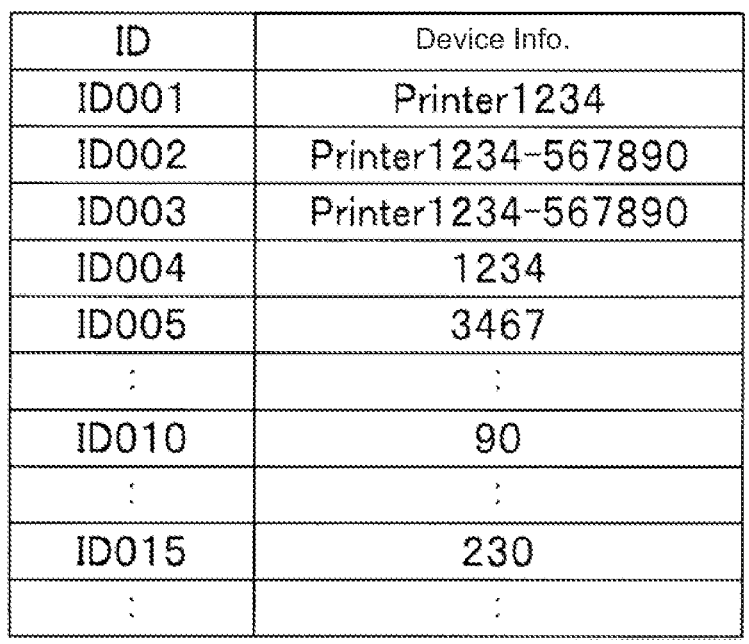
FIG. 6 illustrates an example of an image forming device information table included in the multifunction peripheral server.

FIG. 6 shows an example of the image forming device information table. This image forming device information table 623 is configured from identification (ID) and device information.

In the image forming device information table 623 in the first embodiment, the device information for the ID "ID001" is the model number of the multifunction peripheral 2, the device information for ID "ID002" is a serial number assigned to the multifunction peripheral 2, the device information for ID "ID010" is a remaining toner amount indicted by percentage (%), and the device information for ID "ID0015" is a printed page number.

In the image forming device information table 623 shown in FIG. 6, (ID001) model number "Printer1234" of the multifunction peripheral 2, (ID002) serial number "Printer1234-567890," (ID010) remaining toner amount "90" and (ID015) printed page number "230" are stored.

(Data File Format Management Table 624)

The data file format management table 624 is formed based on the image forming device information table 623 and is updated by the data file format management table update part 613. The data file format management table 624 bases the data file that is analyzable by the data file analysis part 312 of the management server 3.

FIG. 7 shows an example of the data file format management table. The data file format management table 624 is formed based on the image forming device information table 623 shown in FIG. 6 and includes an item number, an item name, a description order number, a counter name, an origination ID, and a default item.

The description order number indicates an order in which the data obtained based on the origination ID is described in the data file at the time when the data file generation part 612 generates the data file.

The origination ID indicates the ID in the image forming device information table 623. By designating this ID, device information that corresponds to the ID is obtained from the image forming device information table 623.

The default item is indicated by " " (none) when the item was additionally set by the later-discussed update process performed by the user U, and by "○" when the item is a preset item. Items for which the default item is indicated by "○" cannot be deleted from the data file format management table 624.

The data file format management table 624 shown in FIG. 7 stores data as follows.

For the item number "001," the item name "Printer Model," description order number "1," the counter name "PrinterModel," the origination ID "image forming device information table (ID001)," the default item "○" are stored in correspondence. For the item number "002," the item name "Serial No.," description order number "2," the counter name "serialNo," the origination ID "image forming device information table (ID002)," the default item "○" are stored in correspondence. For the item number "003," the item name "Remaining Toner Amount," description order number "3," the counter name "TonerLevel," the origination ID "image forming device information table (ID010)," the default item "○" are stored in correspondence. For the item number "004," the item name "Printed Page No.," description order number "4," the counter name "PrinterCounter," the origination ID "image forming device information table (ID015)," the default item "○" are stored in correspondence.

Counter names "PrinterModel," "serialNo," "TonerLevel" and "PrinterCounter" are set as default counter names and are data that can be updated by the data file format management table update part 613.

In the first embodiment, although the data file format management table 624 shown in FIG. 7 includes item names "Printer Model," "Remaining Toner Amount," "Serial No." and "Printed Page Number" that correspond to the data file analysis format table 321 shown in FIG. 3, the counter names for "Printer Model," "Serial No." and "Printed Page Number" are different from those of the data file analysis format table 321.

(Controller 61)

The controller 61 includes an email generation part 611, a data file generation part 612, the data file format management table update part 613 and a detection data processing part 614. The controller 61 is configured from a central processing unit (CPU), for example. Functions of each of the processing units configuring the controller 61 are achieved as the CPU extracts and executes a program (not shown) stored the memory part 62.

(Email Generation Part 611)

The email generation part 611 is a component that generates email to the management server 3 and that causes the communication part 25 to transmit the email.

The email generation part 611 obtains time from the timer part 26 and starts execution of an email generation process at a predetermined timing. In the first embodiment, the email generation part 611 starts the email generation process again after a predetermined time (T) elapses from the time when the email generation part 611 previously perform the email generation process and outputs an email transmission instruction to the communication part 25.

This predetermined time (T) is determined based on the remaining amount of the consumable item used in the multi-function peripheral 2 and a change ratio of the printing times. For example, the predetermined time (T) is configured based on the remaining amount of consumer items, such as sheet and toner. The predetermined (T) is set to 6 hours, for example. In other words, the predetermined time (T) is shortened as the remaining amount of consumable items decreases. That is, when the remaining amount of the consumable items decreases, email is transmitted to the management server 3 more often. In addition, the predetermined time (T) is shortened as the printing times per unit time increases.

In addition, the predetermined time (T) may be determined based on a combination of the printing times per unit time and the remaining amount of the consumable item.

The email generation part 611 that has started the execution of the email generation process obtains the management server mail address 621 and the mail format 622 from the memory part 62 and composes email with the management server mail address 621 being the email recipient and the mail format 622 being the subject and body of the email. In the first embodiment, the email generation part 611 obtains the mail format 622 that has "'xxxxx-yyyyy' PrinterData" in the subject and generates email by describing the serial No. at xxxxx and the printer model at yyyyy.

Then, the email generation part 611 instructs the data file generation part 612 to generate a data file, attaches the data file obtained from the data file generation part 612 to the email and outputs the email to the communication part 25.

In addition, the email generation part 611 may include a function to obtain time from the timer part 26 and to check the data that the detection part 24 detects at a predetermined time period, for example. The email generation part 611 may check the remaining amount of consumable items at a predetermined time period, predict an amount by the consumable item will be consumed in the future and start the email generation process again.

(Data File Generation Part 612)

The data file generation part 612 is a component that generates the data file.

The data file generation part 612 starts a process in response to the data file generation instruction from the email generation part 611. The data file generation part 612 obtains data from the data file format management table 624 of the memory part 62 and generates a data file. The data file generation part 612 then outputs the data file to the email generation part 611.

The data file described in the CSV format is configured from counter names listed in the order of the description order number and device information also listed in the order of the description order number.

An example using the image forming device information table 623 shown in FIG. 6 and the data file format management table 624 shown in FIG. 7 is explained below.

The counter name "PrinterModel" for which the description order number is "1" is read and described in the data file. Next, the counter name "serialNo" for which the description order number is "2" is read and described in the data file. This process is repeated, and a return code "[CR][LF]" is described after reading the counter name of the last description order number and describing the counter name in the data file.

The next line of the data file is described as the origination ID "image forming device information table (ID001)" for which the description order number is "1" is read and as the device information "Printer1234" that corresponds to "ID001" in the image forming device information table 623 (FIG. 6) is obtained. Next, the data file is described as the origination ID "image forming device information table (ID002)" for which the description order number is "2" is read and as the device information "Printer1234-567890" that corresponds to "ID002" in the image forming device information table 623 is obtained. This process is repeated, and a return code "[CR][LF]" is described after reading the origination ID of the last description order number and describing the device information in the data file.

As a result, a data file in the CSV format as shown below is generated.

PrinterModel, serialNo, TonerLevel, PrinterCounter, . . . [CR][LF]
Printer1234, Printer1234-567890, 90, 230, . . . [CR][LF]

(Data File Format Management Table Update Part 613)

The data file format management table update part 613 is a component that updates the configuration of the data file format management table 624 in response to the instruction from the input part 28.

The data file format management table update part 613 converts the configuration of the data file format management table 624 to screen data and displays the screen data on the display of the display part 27 at the time of the update process. Thereafter, the data configuring the data file format management table 624 is updated in response to value data and the update instruction input from the input part 28. The update includes addition, deletion and modification of items of the table, for example. Details of the update process are described later.

(Detection Data Processing Part 614)

The detection data processing part 614 is a processing part that calculates the number of printed sheets, the remaining amount of toner, the remaining number of sheets, the number of scanned documents, and the like, based on the data detected by the detection part 24 and that stores the calculated values in the image forming device information table 623.

The detection data processing part 614 according to the first embodiment counts the number of sheets that the image forming part 23 has printed (i.e., printing times), based on the data provided from the printed page number detection part 241. In addition, the detection data processing part 614 calculates the remaining amount of toner and the remaining number of sheets based on the data provided from the consumable item remaining amount detection part 242. Then, detection data processing part 614 counts the number of image data generated as the image reading part 21 reads the document, based on the data provided from read page number detection part 243.

According to the first embodiment as described above, the user U can generate a data file that is analyzable by the management server 3 using the multifunction peripheral 2 even when the manufacturer of the multifunction peripheral 2 is different from the manufacture of the management server 3 and thus even when the normal data file transmitted from the multifunction peripheral 2 is not analyzable by the management server 3. As a result, the administrator S can manage all of the multifunction peripherals 2 provided at departments of a company using the management server 3, and thus, consumable items that need to be supplemented can be ordered at once.

<<Data File Transmission Process>>

Figure 8:
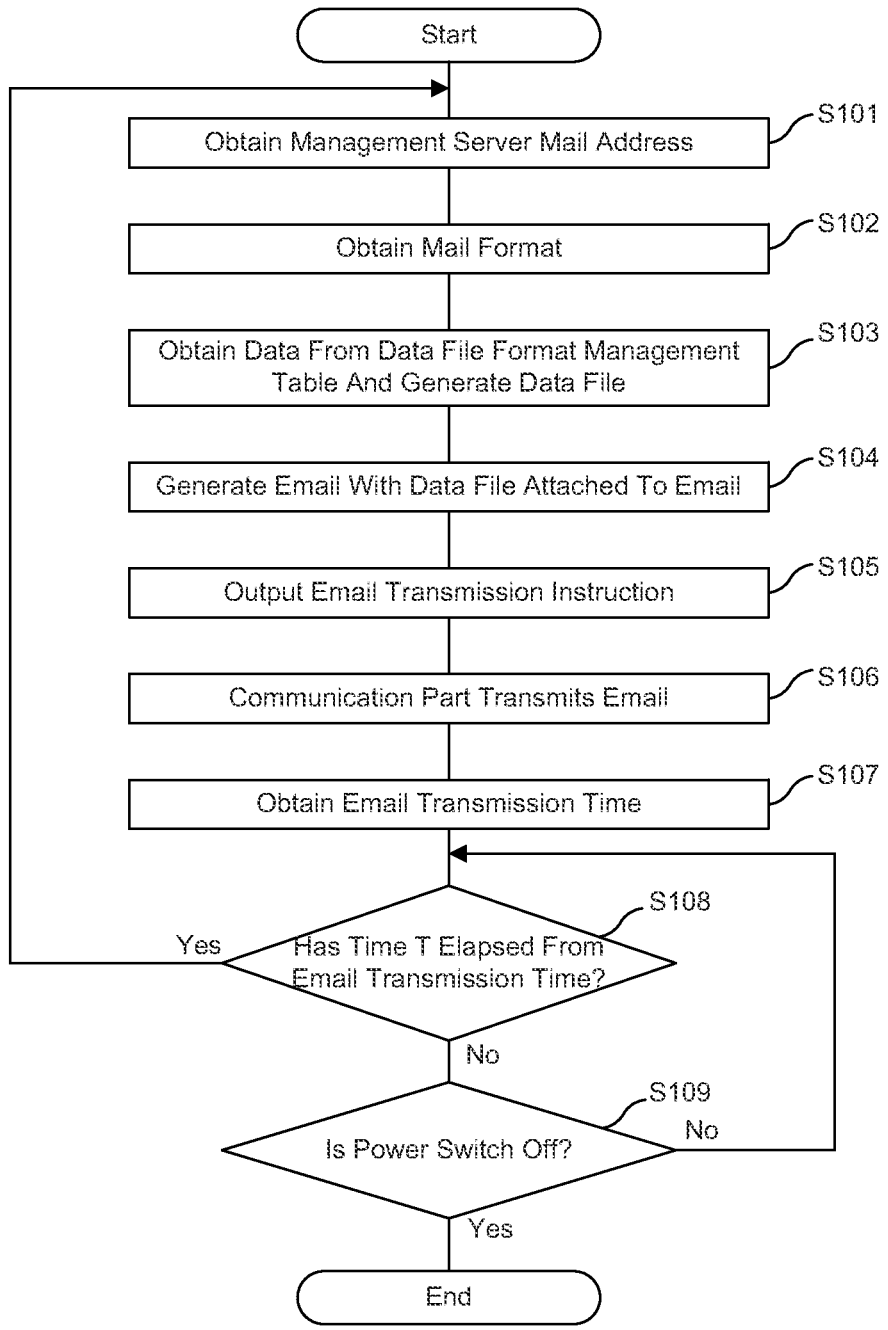
FIG. 8 is a flow diagram for a data file transmission process operation according to the first embodiment.

A data file transmission process executed by the multifunction peripheral 2 is explained using FIG. 8.

Here, the multifunction peripheral 2 is in a condition where the controller 61 is ready for processing as a power has been turned on by the user 2 and is supplied to the CPU of the image processing part 22.

First, the email generation part 611 obtains the management server mail address 621 from the memory part 62 (S101) and obtains the mail format 622 (S102). Then, the email generation part 611 causes the data file generation part 612 to perform the process.

The data file generation part 612 obtains data from the data file format management table 624 in the memory part 62 and generates a data file (S103) and outputs the data file to the email generation part 611.

The email generation part 611 generates email to be transmitted to the management server 3 by composing the email with the management mail address 621 being the recipient and based on the mail format 622 and by attaching the data file to the email (S104). That is, the email generation part 611 generates the email with the data file attached to the email.

Then, an email transmission instruction is outputted to the communication part 25 with the email to which the data file is attached (S105). As a result, the communication part 25 transmits the email to the management server 3 (S106). Then, the email generation part 611 obtains the time at this moment from the timer part 26 as an email transmission time (S107).

Thereafter, the email generation part 611 obtains time from the timer part 26 at a predetermined timing and determines whether or not time T has elapsed from the email transmission time (S108). Here, T is predetermined time (numerical value).

When the time T has elapsed (Yes, S108), the process of S101 is performed again. As a result, the data stored in the management server 3 is updated with the data described in the data file as the data file is transmitted to the management server 3 at every time T.

On the other hand, when the time T has not elapsed (No, S108), the process waits until the time T elapses. The data file transmission process ends when the power switch is turned off by the user U during the wait period. With respect to the process, a determination is made as to whether the power is turned off during the wait period (S109). The process of S108 is repeated when the power switch stays on during the wait period. On the other hand, the data file transmission process is terminated by an interruption process when the power switch is turned off (S109).

<<Data File Format Management Table Update Process>>

Figure 9:
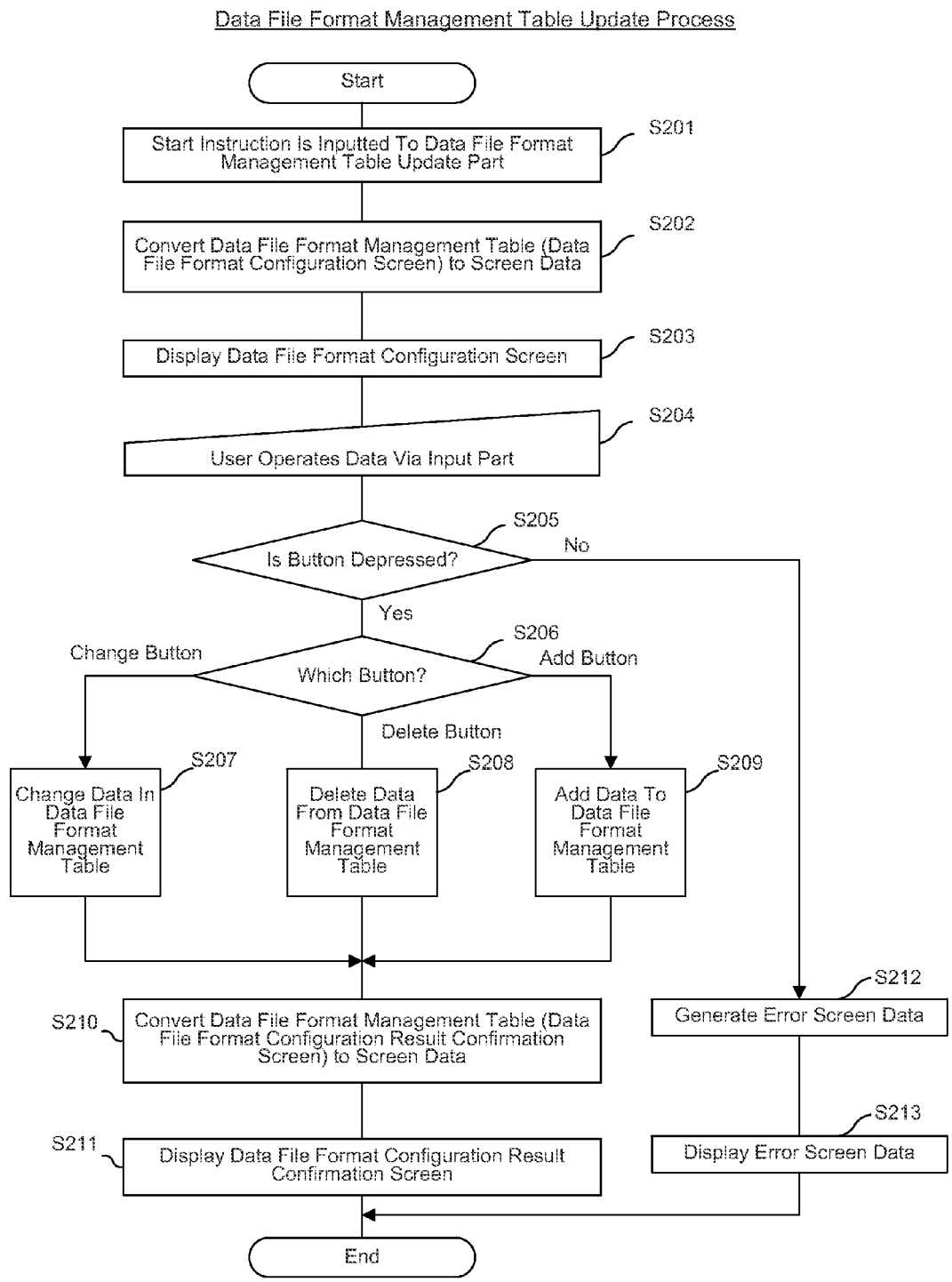
FIG. 9 is a flow diagram for a data file format management table update process operation according to the first embodiment.

A data file format management table update process executed by the multifunction peripheral 2 is explained using FIG. 9. This data file format management table update process is an interruption process. An operation by the user U to operate the input part 28 and to start the data file format management table update part 613 is the trigger for the interruption process. As the operation that becomes the trigger for the interruption process is performed, a start instruction is input to the data file format management table update part 613 (S201). The operation that becomes the trigger is an instruction to open a data file configuration screen.

The data file format management table update part 613 obtains the data of the data file format management table 624 and converts the data file format management table 624 to screen data (S202). The generation of screen data is processed so as to be displayed on the display part 27 as a data file format configuration screen (see FIG. 10).

Then, the data file format management table update part 613 outputs the converted screen data (data file format configuration screen) to the display part 27. As a result, the data file format configuration screen (see FIG. 10) is displayed on the display part 27 (S203).

The user U operates the data via the input part 28 based on the information described in the product specification and the user manual of the management server 4 in the user's hand while seeing the data file format configuration screen displayed on the display part 27 (S204). Then, a determination is made as to whether or not a button in the data file format configuration screen is depressed via the input part 28 (S205).

When the button has been depressed (Yes, S205), the depressed button is determined (S206).

When a change button is depressed ("depression of change button", S206), the data file format management table update part 613 changes the data in the data file format management table 624 to the input data (S207). Then, the process of later-discussed S210 is performed.

When a deletion button is depressed ("depression of deletion button", S206), the data file format management table update part 613 deletes the designated data from the data file format management table 624 when the default item of the designated data is not "○" (S208). Then, the process of later-discussed S210 is performed.

When an add button is depressed ("depression of add button", S206), the data file format management table update part 613 adds the input data to the data file format management table 624 (S209). Then, the process of later-discussed S210 is performed.

The data file format management table update process is explained using the data file format management table 624 shown in FIG. 11. At S204, a configuration for a change is performed by the user U. The user U performs a configuration to adjust the data file analysis format table 321 of the management server 3 while seeing the user manual for the management server 3. At this time, the counter name "PrinterModel" of the item "Printer Model" is changed to "PrinterName;" the description order number "3" of the item "Remaining Toner Amount" is changed to "2;" and the counter name "serialNo" of the item "Serial No." is changed to "serial_no." As a result, the description order number is changed from "2" to "3," and the counter "PrinterCounter" of the item "Printed Sheet No." is changed to "TotalPrintCount." After the input part 28 accepts the change, the data file format management table 624 updated by the data file format management table update part 613 is shown.

The process shown in FIG. 9 is again explained.

After the processes at S207, S208 and S209, the data file format management table update part 613 converts the data file format management table 624 to screen data (S210). The conversion of screen data is processed so as to be displayed on the display part 27 as a data file format configuration result confirmation screen (see FIG. 12).

Then, the data file format management table update part 613 outputs the converted screen data (data file format configuration result confirmation screen) to the display part 27. As a result, the data file format configuration result confirmation screen is displayed on the display part 27 (S211).

A data file format configuration result confirmation screen shown in FIG. 12 is screen data that is converted from the data file format management table 624 shown in FIG. 11 and that is displayed on the display part 27.

On the other hand, when there is no input in the predetermined time in the process at S205, or when a determination that the button has been depressed is not correctly made (No, S205), the data file format management table update part 613 generates error screen data (S212). Here, the error screen data is generated when the delete button is depressed even when the default item is "○."

Then, the data file format management table update part 613 outputs the generated screen data (error screen data) to the display part 27. As a result, the error screen data (not shown) is displayed on the display pat 27 (S213).

Therefore, the data file format management table is updated to the data file format management table 624 shown in FIG. 11. Thereafter, the data file generation part 612 obtains data from the data file format management table 624 in the memory part 62 and generates data file at S103 shown in FIG. 8. At this time, a data file in the CSV format as shown below is generated.

PrinterName, TonerLevel, serial_no, TotalPrintCount, . . . [CR] [LF]
Printer1234, 90, Printer1234-567890, 230, . . . [CR][LF]

Then, "Printer1234," "Printer1234-567890," "90" and "230" are stored in correspondence to the printer models, the serial numbers, the remaining toner amounts (%), and the printed page numbers in the management subject device information table 322 in the management server 3. As a result, as the administrator S inputs a view request for the "Management Subject Device Information View Screen" associated with the multifunction peripheral 2 via the input part 35, the "Management Subject Device Information View Screen" that includes information of the multifunction peripheral 2 of the printer model "Printer1234" is displayed on the display part 34. Therefore, the administrator S is able to obtain the information of the multifunction peripheral 2 via the management server 3.

According to the multifunction peripheral 2 of the first embodiment that includes the above-described configuration, when the counter name in the data file analysis format table 321 in the management server 3 is "PrinterName" (see FIG. 3), the user U only needs to associate the counter names "PrinterModel" and "PrinterName" for the Printer Model of the multifunction peripheral 2 in the "Data File Format Configuration Screen" displayed on the display part 3 (see FIG. 10 to FIG. 12).

With this operation, the information "Printer1234" registered for the "PrinterModel" is included in the email (data file) transmitted at periodic timing to the management server 3 as "PrinterName." In addition, by analyzing the email (data file) received by the management server 3, "Printer1234" is stored as data for the counter name "PrinterName" of the multifunction peripheral 2 in the item for the printer model in the management subject device information table 322.

Second Embodiment

Here, an example of a pattern, in which a value of data needs to be calculated when an item that does not exists in the data file analysis format table 321 in the management server 3 is newly added to the data file format management table 624, is explained as a second embodiment.

An image processing device management system according to the second embodiment is the same as the image processing device management system 1 according to the first embodiment. Therefore, explanation of the image processing device management system is omitted. In addition, a multifunction peripheral and a management server according to the second embodiment include the same configuration as the multifunction peripheral 2 and the management server 3 according to the first embodiment. Here, as described below, with exceptions that data that includes a plurality of IDs in each of items and a mathematical formula in the data file format management table 624 can be registered, and that a function for calculation is added to the data file generation part 612, the functions of the second embodiment are substantially similar to the functions of the first embodiment.

The data file analysis format table 321 in the management server 3 may be of the following data configuration.

Figure 13:
FIG. 13 is another example of a data file analysis format table included in the management server.

FIG. 13 shows an example of the data file analysis format table 321. Similar to FIG. 3, the data file analysis format table 321 is configured from item names and counter names.

Under the item name, "Printer Model," "Remaining Toner Amount," "Serial No.," "Printed Page Numbers" and the like are registered. The counter name is configured and stored for each item. In FIG. 13, the counter names "PrinterName," "TonerLevel," "serial_no," and "TotalPrintCount" are stored in correspondence with the item name "Printer Model," "Remaining Toner Amount," "Serial No.," and "Printed Page Numbers," respectively.

This counter name "TotalPrintCount" indicates a total number of sheets fed from each tray (tray 1, tray 2 and tray 3) in which sheets are installed.

The user U configures a mail format and information about the data to be described in a data file by operating the input part 28 of the multifunction peripheral 2 while confirming the user manual and the product specification of the management server 3. However, the following configuration is also available.

The multifunction peripheral 2 inquires the mail format and the information about the data to be described in the data file, by transmitting email in the predetermined mail format to the management server 3. Here, the predetermined mail format is email with "Format Inquiry" as the subject and no body in the email.

When the management server 3 receives the email in the predetermined format from the multifunction peripheral 2, the management server 3 transmits the mail format and the information about the data to be described in the data file to the multifunction peripheral 2 that transmitted the email.

The multifunction peripheral 2 displays the information received from the management server 3 on the screen of the display part 20 based on the request from the user received via the input part 28. Therefore, the user U can configure the mail format and the information about the data to be described in the data file to the multifunction peripheral 2 by referring to the screen. The multifunction peripheral 2 may display the information on the screen of the display part 20 in synchronization with the reception of email from the management server 3, without operation by the user U.

Figure 14:
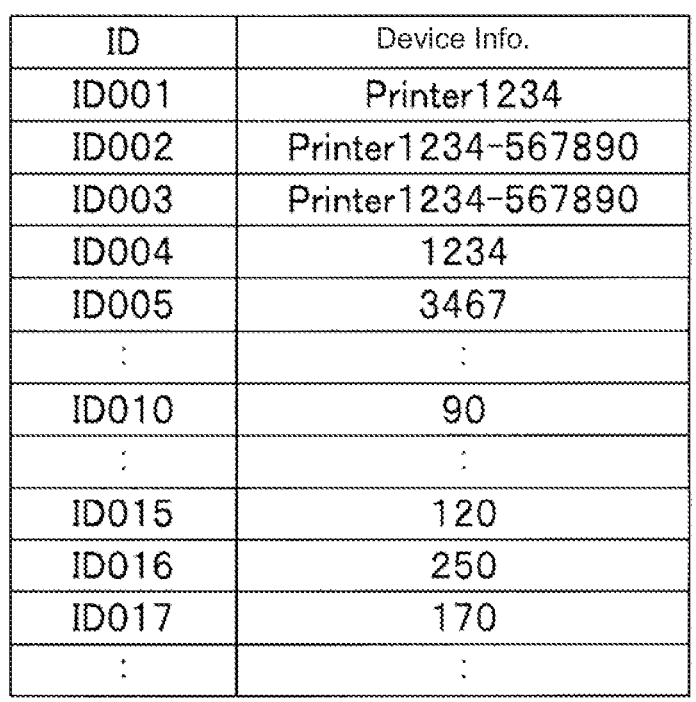
FIG. 14 is another example of the image forming device information table included in the multifunction peripheral.

FIG. 14 shows an example of the image forming device information table. Similar to FIG. 6, this image forming device information table 623 is configured from identification (ID) and device information.

The image processing device 2 includes three trays "tray 1," "tray 2" and "tray 3" in which sheets are installed. In the image forming device information table 623, device information at ID "ID015" is a number of sheets fed from the tray 1. Device information at ID "ID016" is a number of sheets fed from the tray 2. Device information at ID "ID017" is a number of sheets fed from the tray 3.

In the image forming device information table 623 shown in FIG. 14, "120," "250" and "170" are stored for (ID015) tray 1 device information, (ID016) tray 2 device information and (ID017) tray 3 device information, respectively.

The data file format management table 624 is formed based on the image forming device information table 623 and is updated by the data file format management table update part 613.

FIG. 15 shows an example of the data file format management table. The data file format management table 624 is formed based on the image forming device information table 623 shown in FIG. 14 and includes item numbers, item names, description order numbers, counter names, origination IDs, and default items, which are similar to FIG. 7.

The data file format management table 624 shown in FIG. 15 stores data as follows.

For the item number "001," the item name "Printer Model," description order number "1," the counter name "PrinterModel," the origination ID "image forming device information table (ID001)," the default item "○" are stored in correspondence. For the item number "002," the item name "Serial No.," description order number "2," the counter name "serialNo," the origination ID "image forming device information table (ID002)," the default item "○" are stored in correspondence. For the item number "003," the item name "Remaining Toner Amount," description order number "3," the counter name "TonerLevel," the origination ID "image forming device information table (ID010)," the default item "○" are stored in correspondence. For the item number "004," the item name "Tray 1 Printed Page Number," description order number "4," the counter name "Tray1PrintCount," the origination ID "image forming device information table (ID015)," the default item "○" are stored in correspondence. For the item number "005," the item name "Tray 2 Printed Page Number," description order number "5," the counter name "Tray2PrintCount," the origination ID "image forming device information table (ID016)," the default item "○" are stored in correspondence. For the item number "006," the item name "Tray 3 Printed Page Number," description order number "6," the counter name "Tray3PrintCount," the origination ID "image forming device information table (ID017)," the default item "○" are stored in correspondence.

Counter names "PrinterModel," "serialNo," "TonerLevel," "PrinterCounter," "Tray1PrintCount," "Tray2PrintCount" and "Tray3PrintCount" are set as default counter names and are data that can be updated by the data file format management table update part 613.

In the second embodiment, although the data file format management table 624 shown in FIG. 15 includes item names "Printer Model," "Remaining Toner Amount" and "Serial No." that correspond to the data file analysis format table 321 shown in FIG. 13, the item name "Printed Page Number" is not included. Instead, the data file format management table 624 includes item names "Tray 1 Printed Page Number," "Tray 2 Printed Page Number" and "Tray 3 Printed Page Number."

In addition, the counter names for "Printer Model," "Serial No." and "Printed Page Number" are different from those of the data file analysis format table 321.

That is, the data file format management table 624 shown in FIG. 15 does not include information, such as the counter name "TotalPrintCount" in the data file analysis format table 321 shown in FIG. 15, which indicates a total number of sheets fed from the tray included in the multifunction peripheral 2. Therefore, it is necessary to add the item "TotalPrintCount" in order to generate a data file that the management data 3 can analyze.

A data file format management table update process executed by the multifunction peripheral 2 is explained using a flow diagram shown in FIG. 9.

The data file format management table update part 613 obtains the data of the data file format management table 624 and converts the data file format management table 624 to screen data (S202).

Then, the data file format management table update part 613 outputs the converted screen data (data file format configuration screen) to the display part 27. As a result, the data file format configuration screen is displayed on the display part 27 (S203).

The user U operates the data via the input part 28 based on the information described in the product specification and the user manual of the management server 4 in the user's hand while seeing the data file format configuration screen displayed on the display part 27 (S204). At this time, the user U becomes aware that the counter name "TotalPrintCount" needs to be added as the item name "Printed Page Number" in the management server 3.

Therefore, the user U performs an operation to add the information that indicates a total number of sheets in each of the item names "Tray 1 Printed Page Number," "Tray 2 Printed Page Number" and "Tray 3 Printed Page Number" to the data file format management table 624. As a result, as shown in FIG. 16, a description order number "20," an item name "Total Printed Page Number," an item number "020," a counter name "TotalPrintCount" and an origination ID "Image Forming Device Information Table (ID015+ID016+ID017)" are input and added to the data file format management table 624 as the user U presses an Add button. The data file format management table 624 shown in FIG. 17 shows a result when the user U performs an operation (press a Change button) to change the description order numbers for the item names "Tray 1 Printed Page Number," "Tray 2 Printed Page Number" and "Tray 3 Printed Page Number," which are information not necessary for the management server 3, to blanks and performs an operation (press the Change button) to change the description order number "20" for the added item name "Total Printed Page Number" to "4," after the item name "Total Printed Page Number" is added.

Thereafter, the data file generation part 612 obtains data from the data file format management table 624 shown in FIG. 17 and generates a data file.

At this time, the data file generation part 612 generates the data file by obtaining the data in the order of the description order number. Then, when the fourth item "Origination ID 'Image Forming Device Information Table (ID015+ID016+ID017) is obtained, the data file generation part 612 obtains the device information "120" for ID "ID015," the device information "250" for ID "ID016" and the device information "170" for ID "ID017" from the image forming device information table 623 shown in FIG. 14 and calculates ID015+ID016+ID017. This calculated value "540" is described in the data file.

As a result, the data file as shown below is generated. Here, characters "," (colon) are described as separation characters.
PrinterName, serial_no, TonerLevel, TotalPrintCount, . . . [CR] [LF]
Printer1234, Printer1234-567890, 90, 540, . . . [CR][LF]

The present embodiments are not limited to those described above, and various changes and modifications are available without departing from the scope of the invention.

For example, email is used as a means to transmit a data file in the present embodiments. However, this may only be a means by which the management server 3 obtains the data file from the multifunction peripheral 2.

In addition, the present invention is also applicable in the management server 3 that does not include the data file analysis format table 321.

When the management server 3 does not include the data file analysis format table 321 but includes a function for determining an item of the management subject device information table 322 based on the description order number in a data file, for example, the data file generation part 612 of the multifunction peripheral 2 describes in the data file the data obtained by reading a content that correspond to the "Origination ID" without describing the "Counter Name" in the data file.

As a result, the following data file in the CSV format is generated when the data file generation part 612 generates the data file based on the image forming device information table 623 shown in FIG. 6 and the data file format management table 624 shown in FIG. 7.

Printer1234, Printer1234-567890, 90, 230, . . . [CR][LF]

In addition, in the data file transmission process executed by the multifunction peripheral 2 shown in FIG. 8, the process for generating the email (process at S101) starts when the power switch of the multifunction peripheral 2 is turned on, the power is supplied to the CPU of the image processing part 22, and the controller 61 turns ready for the process. However, absolute time may be set as the time at which the email is initially transmitted, for example. For instance, 15:00 may be set as the absolute time, and email generation part 611 may start the process at S101 when the time obtained from the timer part 26 is 15:00.

What is claimed is:

1. An image processing device that is connected to a management server that analyzes a data file in which information is described in a predetermined format and that provides an administrator with the information, the image processing device comprising:
   a data file format management table that arranges and stores data, which is information of the image processing device;
   an input part that accepts from a user an instruction for changing the data in the predetermined format;
   a data file format management table update part that rearranges the data stored in the data file format management table based on the instruction;
   a data file generation part that generates a file by describing the data stored in the data file format management table after the rearrangement; and
   a communication part that transmits the file as the data file to the management server, wherein
   the data file format management table stores the data in correspondence with management items,
   when an addition instruction is input to the input part, the data file format management table update part adds a new management item in the data file format management able,
   when a delete instruction is input to the input part, the data file format management table update part deletes a management item that is designated by the delete instruction from the data file format management table, and
   when a change instruction is input to the input part, the data file format management table update part changes a management item that is designated by the change instruction in the data file format management table.

2. The image processing device according to claim 1, wherein
   the data file format management table stores the management items in correspondence with description order number items,
   the data file format management table update part updates numbers of the description order number items based on the predetermined format upon a reception of the instruction from the input part, and
   the data file generation part generates the file by describing the data that corresponds to the management items in an order of the numbers of the description order number items.

3. The image processing device according to claim 1, wherein
   when the input part receives, from the user, an instruction for corresponding plural kinds of the data to one of the management items with a mathematical formula,
   the data file format management table stores the plural kinds of the data in correspondence with the one of the management items, together with the mathematical formula, and
   the data file generation part calculates a numerical value for each of the plural kinds of the data using the mathematical formula, and generates the file by describing the calculated values.

4. The image processing device according to claim 2, wherein
   when the input part receives, from the user, an instruction for corresponding plural kinds of the data to one of the management items with a mathematical formula,
   the data file format management table stores the plural kinds of the data in correspondence with the one of the management items, together with the mathematical formula, and
   the data file generation part calculates a numerical value for each of the plural kinds of the data using the mathematical formula, and generates the file by describing the calculated values.

5. The image processing device according to claim 1, further comprising:
   a display part that two-dimensionally displays screen data on a screen, wherein
   the data file format management table update part converts the data file format management table to screen data and provides the screen data to the display part.

6. The image processing device according to claim 1, wherein
   when predetermined time elapses after the communication part transmits the data file to the management server,
   the data file generation part generates a new file by describing the data stored in the data file format management table, and
   the communication part transmits the new file as the data file to the management server.

7. The image processing device according to claim 1, further comprising:
   an email generation part that generates an email to be transmitted by the communication part, wherein
   the email generation part generates the email in a predetermined format by which a process for extracting an attachment file is to be performed when the management server receives the email, and attaches the data file generated by the data file generation part to the email.

8. An image forming device, comprising:
   the image processing device according to claim 1.

9. The image forming device according to claim 8, further comprising:
   an image forming part that forms an image on a medium; and
   an image formation times detection part that counts a number of times that the image is formed on the medium, wherein the data file format management table stores the number of times that the image is formed, the number of times being counted by the image formation times detection part.

10. The image forming device according to claim 8, further comprising:
a consumable item remaining amount detection part that detects a remaining amount of a consumable item, wherein
the data file format management table stores the remaining amount of the consumable item detected by the consumable item remaining amount detection part.

11. An image processing device management system configured with a management server and an image processing device that is connected to the management server, comprising:
the management server including:
a management subject device information table that stores information in a layout configuration based on a predetermined format,
a management server communication part that receives a data file from the image processing device,
a data file analysis part that analyzes the data file, that extracts data described in the predetermined format, and that stores the data in the management subject device information table,
a data file analysis format table processing part that converts the layout configuration of the management subject device information table and the data stored in the management subject device information table to screen data, and
a display part that displays the screen data in an image; and
the image processing device, including:
a data file format management table that arranges and stores the data, which is information of the image processing device,
an input part that accepts from a user an instruction for changing the data in the predetermined format,
a data file format management table update part that rearranges the data stored in the data file format management table based on the instruction,
a data file generation part that generates a file by describing the data stored in the data file format management table after the rearrangement, and
an image processing device communication part that transmits the file as the data file to the management server, wherein
the management server displays the information of the image processing device on the display part provided with the management server.

12. The image processing device management system according to claim 11, wherein
the data file format management table stores the data in correspondence with management items and stores the management items in correspondence with description order number items,
the data file format management table update part updates numbers of the description order number items based on the predetermined format upon a reception of the instruction from the input part, and
the data file generation part generates the file by describing the data that corresponds to the management items in an order of the numbers of the description order number items.

13. The image processing device management system according to claim 11, wherein
the data file format management table stores the data in correspondence with management items,
when an addition instruction is input to the input part, the data file format management table update part adds a new management item in the data file format management table,
when a delete instruction is input to the input part, the data file format management table update part deletes a management item that is designated by the delete instruction from the data file format management table, and
when a change instruction is input to the input part, the data file format management table update part changes a management item that is designated by the change instruction in the data file format management table.

* * * * *